United States Patent
Salmela

(10) Patent No.: US 6,322,051 B1
(45) Date of Patent: Nov. 27, 2001

(54) ELASTOMERIC MOLDED VALVE STEM AND SPRING HAT

(75) Inventor: Juha K. Salmela, Citrus Heights, CA (US)

(73) Assignee: Automatic Bar Controls, Inc., Vacaville, CA (US)

( * ) Notice: Subject to any disclaimer, the term of this patent is extended or adjusted under 35 U.S.C. 154(b) by 0 days.

(21) Appl. No.: 09/476,858

(22) Filed: Jan. 3, 2000

(51) Int. Cl.[7] .................................................. F16K 1/00
(52) U.S. Cl. ......................... 251/321; 251/356; 251/357; 251/358; 251/368
(58) Field of Search ................................. 251/321, 356, 251/357, 358, 368

(56) References Cited

U.S. PATENT DOCUMENTS

| | | | |
|---|---|---|---|
| 4,064,909 | * | 12/1977 | Neward ........................... 137/625.48 |
| 4,074,700 | * | 2/1978 | Engle ............................... 137/625.27 |
| 4,522,374 | * | 6/1985 | Neff .................................... 251/356 |
| 4,728,077 | * | 3/1988 | Takahashi ............................. 251/257 |
| 4,756,160 | * | 7/1988 | Wimbush .............................. 60/589 |
| 4,846,216 | * | 7/1989 | Raymond ........................ 137/516.27 |
| 4,883,204 | * | 11/1989 | Kay et al. ............................. 222/192 |
| 4,917,351 | * | 4/1990 | Lindbloom et al. ............. 251/129.18 |
| 5,244,185 | * | 9/1993 | Clapp et al. ........................... 251/321 |
| 5,901,749 | * | 5/1999 | Watson ............................. 137/625.66 |

* cited by examiner

Primary Examiner—A. Michael Chambers
Assistant Examiner—Thomas L. McShane
(74) Attorney, Agent, or Firm—Townsend and Townsend and Crew LLP

(57) ABSTRACT

A valve comprises a valve body including a valve cavity with an inlet and an outlet. The valve body has a valve seat in the valve cavity. The valve seat has a flow passage disposed between the inlet and the outlet. A valve stem is movable in the valve cavity between an open position and a closed position. The valve stem includes a substantially rigid shaft and a resilient shell. The resilient shell is generally tubular, and is injection molded around a portion of the shaft. The resilient shell includes a sealing surface which is spaced from the valve seat with the valve stem in the open position and which is pressed against the valve seat to block the flow passage between the inlet and the outlet with the valve stem in the closed position. The resilient shell includes a spring cavity. A resilient spring hat has a spring seat. The resilient spring hat is disposed in the valve cavity with a press fit against an inner surface of the valve cavity to seal the valve cavity against leakage. A spring is connected between the spring cavity of the resilient shell and the spring seat of the resilient spring hat. The spring biases the valve stem toward the closed position.

20 Claims, 2 Drawing Sheets

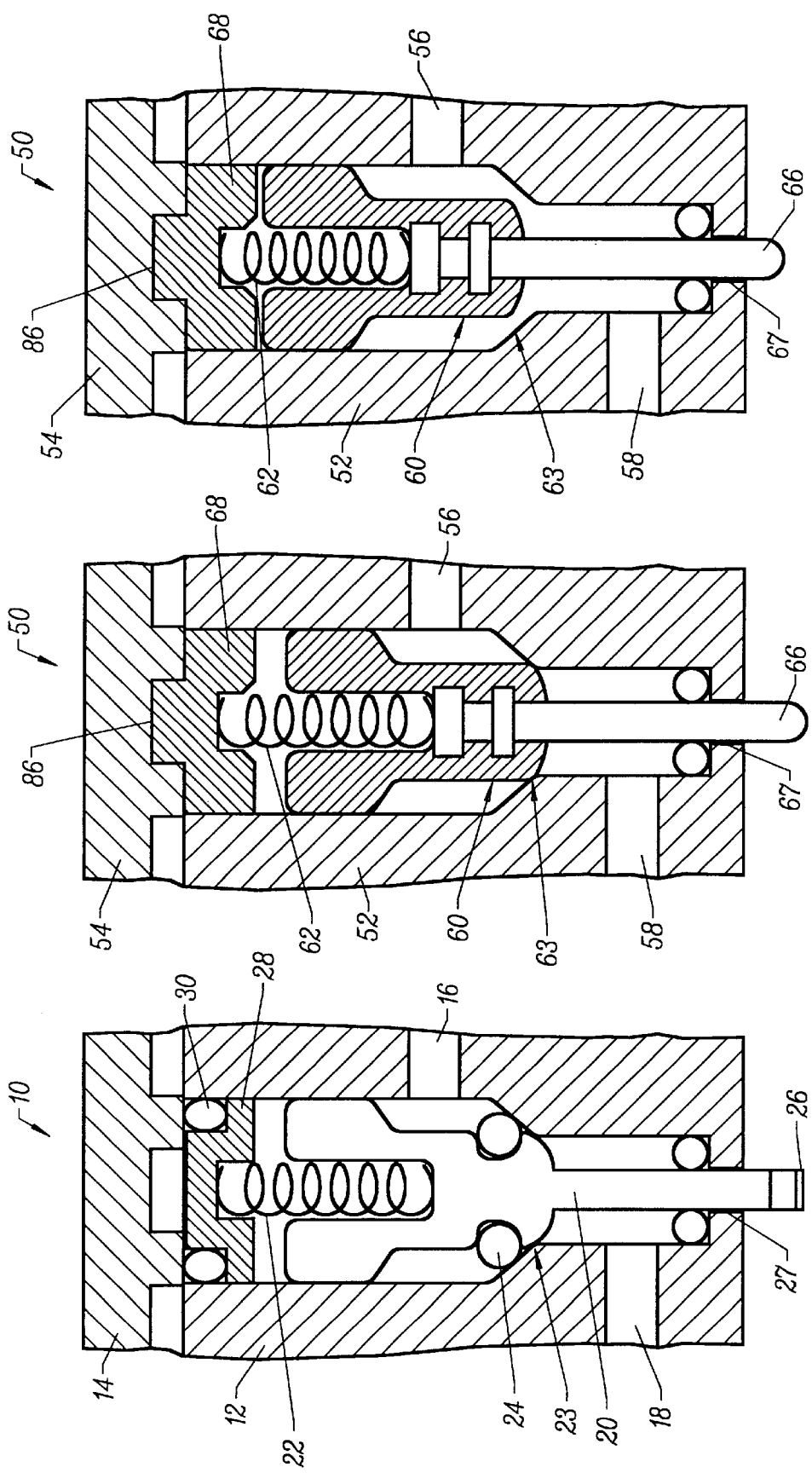

ELASTOMERIC MOLDED VALVE STEM AND SPRING HAT

BACKGROUND OF THE INVENTION

This invention relates generally to dispensing systems, and more particularly to a valve assembly in an apparatus for dispensing beverages or the like.

Valve apparatus are commonly used in dispensing systems for controlling the flow of fluids such as beverages and condiments. Conventional valve apparatus employ rubber O-rings or similar sealing members for sealing valve chambers and other components to prevent leakage. The use of O-rings increases the parts count, and can render assembly of the valve apparatus difficult and cumbersome. O-rings can also be problematic in failing to provide the desired sealing. For example, O-rings typically have parting lines along the inner diameter and the outer diameter, which can lead to mismatch and inadequate sealing.

SUMMARY OF THE INVENTION

The present invention is directed to a valve assembly which employs an elastomeric valve stem movable between an open position and a closed position. In the open position, the valve stem is spaced from a valve seat having a flow passage between the inlet and the outlet to allow fluid flow through the valve. In the closed position, the valve stem is moved toward the valve seat to seal the flow passage to block fluid flow therethrough. Because the elastomeric valve stem provides sealing against the valve seat, no O-rings or other separate sealing members are needed. In a specific embodiment, the valve stem is movable inside a valve chamber for controlling fluid flow therethrough, and a spring applies a spring force biasing the valve stem toward the closed position. An elastomeric spring hat is provided to support the spring inside the valve chamber. The spring hat seals the valve chamber to prevent leakage without the need for an O-ring or a separate sealing member.

In accordance with an aspect of the present invention, a valve comprises a valve body including a valve cavity with an inlet and an outlet. The valve body has a valve seat in the valve cavity. The valve seat has a flow passage disposed between the inlet and the outlet. A valve stem is movable in the valve cavity between an open position and a closed position. The valve stem includes a substantially rigid core and a resilient shell. The resilient shell is generally tubular and surrounds at least a portion of the rigid core. The resilient shell includes a sealing surface which is spaced from the valve seat with the valve stem in the open position and which is pressed against the valve seat to block the flow passage between the inlet and the outlet with the valve stem in the closed position.

In some embodiments, the core of the valve stem comprises a longitudinal shaft. The resilient shell comprises an elastomeric material such as Santoprene™ elastomer that is molded onto the core, for example, by injection molding. The resilient shell may include an annular sealing surface. In a specific embodiment, the annular sealing surface is slanted, and makes an angle with the axis of movement of the valve stem of about 59°.

In accordance with another aspect of the invention, a valve comprises a valve body including a valve cavity with an inlet and an outlet. The valve body has a valve seat in the valve cavity. The valve seat has a flow passage disposed between the inlet and the outlet. A valve stem is movable in the valve cavity between an open position and a closed position. The valve stem includes a core and a resilient shell. The resilient shell is generally tubular and molded onto the core. The resilient shell includes a sealing surface which is spaced from the valve seat with the valve stem in the open position and which is pressed against the valve seat to block the flow passage between the inlet and the outlet with the valve stem in the closed position.

In accordance with another aspect of the invention, a valve comprises a valve body including a valve cavity with an inlet and an outlet. The valve body has a valve seat in the valve cavity. The valve seat has a flow passage disposed between the inlet and the outlet. A valve stem is movable in the valve cavity between an open position and a closed position. The valve stem includes a core and a resilient shell. The resilient shell includes a sealing surface which is spaced from the valve seat with the valve stem in the open position and which is pressed against the valve seat to block the flow passage between the inlet and the outlet with the valve stem in the closed position. The resilient shell includes a spring cavity. A resilient spring hat has a spring seat. The resilient spring hat is disposed in the valve cavity and makes a sealing contact with an inner surface of the valve cavity. A spring is connected between the spring cavity of the resilient shell and the spring seat of the resilient spring hat. In some embodiments, the resilient spring hat comprises an elastomeric material such as Santoprene™ elastomer.

BRIEF DESCRIPTION OF THE DRAWINGS

FIG. 1 is a partial cross-sectional view of a prior valve assembly;

FIG. 2 is a partial cross-sectional view of a valve assembly showing a valve stem in a closed position according to an embodiment of the present invention;

FIG. 3 is a partial cross-sectional view of the valve assembly of FIG. 2 showing the valve stem in an open position;

DESCRIPTION OF THE SPECIFIC EMBODIMENTS

Figure 7:
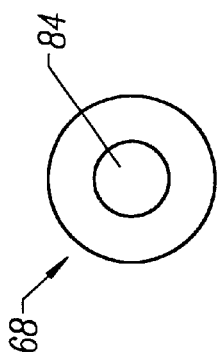
FIG. 7 is a top plan view of the spring hat of FIG. 6.

FIG. 1 shows a prior valve assembly 10 including a valve body or housing 12 which is mounted to a support plate 14. The support plate 14 may be part of a dispensing device or handle. The valve housing 12 has a cavity defining a valve chamber therein, and has an inlet 16 and an outlet 18 for fluid transfer through the chamber. A valve stem 20 is disposed inside the valve housing 12. A spring 22 is connected to the valve stem 20 to bias it toward a valve seat 23 in a closed position. An O-ring 24 is mounted on an annular groove of the valve stem 20 to seal the valve stem 20 against the valve seat 23 in the closed position to block fluid flow therethrough. The valve stem 20 has a distal end 26 which extends through a valve stem passage 27 and is exposed. The valve stem 20 is movable from the closed position upward to an open position by pushing on the distal end 26 to compress the spring 22 and open the valve seat 23 to permit fluid flow therethrough. A spring hat 28 is disposed above the spring 22 and provides a spring seat for supporting the spring 22. Another O-ring 30 is placed between the spring hat 28 and the inner surface of the valve housing 12 to seal the upper end of the housing 12 to prevent leakage.

The valve assembly 50 of FIGS. 2 and 3 eliminates the use of O-ring 24 for the valve stem and the O-ring 30 for the spring hat. The valve assembly 50 includes a valve housing 52 which is mounted to a support plate 54. The valve housing 52 defines a valve chamber having an inlet 56 and an outlet 58 for fluid transfer through the chamber. A valve stem 60 is disposed inside the valve housing 52. A spring 62 is connected to the valve stem 60 to bias it toward a valve seat 63 in a closed position shown in FIG. 2. The valve seat 63 is disposed between the inlet 56 and the outlet 58, and has a slanted, annular surface. The valve stem 60 has a distal end 66 which extends through the valve stem passage 67. The valve stem 60 is movable from the closed position in FIG. 2 upward to an open position as shown in FIG. 3 by pushing on the exposed distal end 66 to compress the spring 62. In the open position, the valve stem 60 is spaced from the valve seat 63 to permit fluid flow through the chamber to the outlet 58. A spring hat 68 is disposed above the spring 62 and provides a spring seat for supporting the spring 62.

Figure 5:
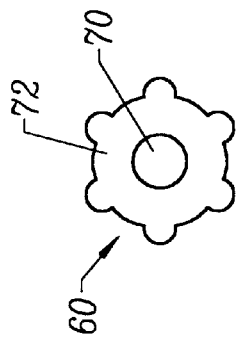
FIG. 5 is a top plan view of the valve stem of FIG. 4.
Figure 4:
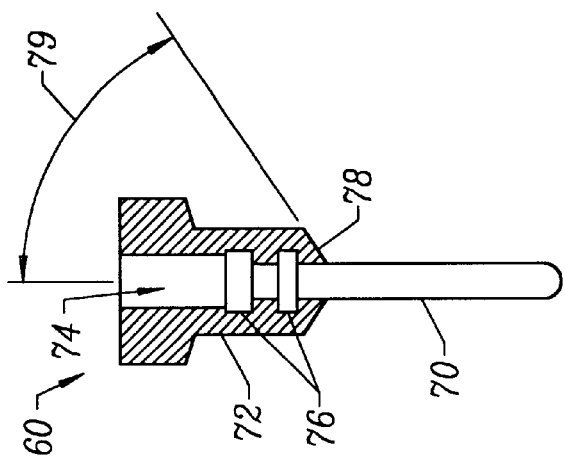
FIG. 4 is a partial cross-sectional view of the valve stem in the valve assembly of FIG. 2.

As best seen in FIGS. 4 and 5, the valve stem 60 includes a generally rigid core or shaft 70 and a resilient sleeve or shell 72. The resilient shell 72 is a generally tubular member extending proximal to the core 70 and forming a spring cavity 74 for receiving a lower portion of the spring 62. The shaft 70 desirably includes one or more spools or spool-like members 76 have larger cross-sections than the remainder of the shaft 70 to better secure the connection with the resilient shell 72. The resilient shell 72 includes a sealing surface 78. In the specific embodiment shown, the sealing surface 78 is slanted for engaging the slanted surface of the valve seat 63. The angle 79 of the sealing surface 78 measured from the axis of movement along the shaft 70 is typically about 59°, but may range, for example, from about 15° (close to being parallel with the axis) to about 90°(perpendicular to the axis). In other embodiments, the sealing surface 78 may be substantially perpendicular to the axis of the shaft 70.

The core 70 is typically made of a metal such as stainless steel, but may be made of other rigid or substantially rigid materials such as hard polymers. The resilient shell 72 is made of a deformable material such as an elastomeric material that deforms to provide a sealing contact with the valve seat 63 when the sealing surface 78 is pressed against the valve seat 63 (FIG. 2). The resilient shell 72 may be a separate member that is attached to the core 70. In a preferred embodiment, the resilient shell 72 includes a material that can be molded onto the core 70, for instance, by injection molding. Molding the resilient shell 72 onto the core 70 to form an integrated valve stem 60 reduces leak paths. Unlike the O-rings, the resilient shell 72 has no parting lines on the sealing surface 78. One suitable material for the resilient shell 72 is Santoprene™ elastomer which is available from General Polymers, a division of Ashland Chemical Company.

In the closed position as illustrated in FIG. 2, the force of the spring 62 biases the valve stem 60 toward the valve seat 63, compressing the sealing surface 78 of the resilient shell 72 against the slanted surface of the valve seat 63. The resilient shell 72 deforms to form a fluid-tight seal at the sealing surface 78 to block fluid flow through the flow passage at the valve seat 63. Because the resilient shell 72 serves the sealing function, no O-ring is needed.

The outer surface of the resilient shell 72 is spaced slightly from the inner chamber wall of the housing 52 to permit sliding in the chamber. The outer surface of the shell 72 desirably matches generally in shape with the inner chamber wall to guide movement of the valve stem 60 as it slides in the chamber.

To move the valve stem 60 to the open position shown in FIG. 3, a force is applied to the exposed distal end 66 of the core 70 upward to compress the spring 62. The resilient shell 72 is spaced from the valve seat 63 to permit fluid flow from the inlet 56 through the flow passage at the valve seat 63 to the outlet 58.

Figure 6:
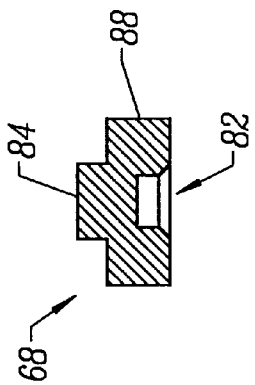
FIG. 6 is a cross-sectional view of the spring hat in the valve assembly of FIG. 2.

The spring hat 68 as shown in FIGS. 2 and 3 desirably is formed of a resilient material such as an elastomeric material that is deformable to provide sealing. As best seen in FIGS. 6 and 7, the spring hat 68 includes a spring seat 82 which is generally aligned with the spring cavity 74 of the valve stem 60 for receiving an upper portion of the spring 62 (FIGS. 2 and 3). An upper protrusion 84 is configured to be press fitted into an aligning cavity 86 of the support plate 54 (FIGS. 2 and 3). An outer sealing surface 88 is press fitted into the chamber of the valve housing 52 to seal the chamber to prevent leakage. Because the resilient spring hat 68 is deformable to seal the chamber and form a sealed connection between the valve housing 52 and the support plate 54, no O-ring is needed. In specific embodiments, the spring hat 68 is formed from an elastomeric material such as Santoprene™ elastomer, for example, by injection molding.

The resilient spring hat 68 of FIGS. 2 and 3 has only one leak path between the sealing surface 88 and the chamber wall of the valve housing 52. In contrast, the O-ring in the valve assembly 10 of FIG. 1 has two leak paths along the outer diameter and the inner diameter of the O-ring 30.

Moreover, the use of the resilient spring hat 68 renders assembly of the valve 50 easier and more precise. There are typically a plurality of valves that need to be assembled in alignment with the support plate. In the valve assembly 10 of FIG. 1, assembly can be difficult because one needs to squeeze each spring 22 individually between the valve stem 20 and the spring hat 28 and to place the O-ring 30 around the spring hat 28 without any guidance. Each individual valve 10 must be assembled using manual pressure, and be aligned manually with the alignment cavities of the support plate 14.

In the embodiment of FIGS. 2 and 3, the protrusion 84 of each spring hat 68 may be press fitted into the corresponding alignment cavity 86 of the support plate 54 so that the spring cavities 82 of the spring hats 68 are aligned. The springs 62 are supported in the spring cavities 74 of the valve stems 60 in the chambers of the valve housings 52, which are spatially arranged in a dispenser body to match the alignment cavities 86 of the support plate 54. Because the springs 62 are properly aligned in the valve chambers of the dispenser body and the spring hats 68 are properly aligned in the alignment cavities 86 of the support plate 54, it is relatively easy to assemble the valves 50 in proper alignment by placing the support plate 54 (with the aligned spring hats 68) over the dispenser body (with the aligned springs 62).

The above-described arrangements of apparatus and methods are merely illustrative of applications of the principles of this invention and many other embodiments and modifications may be made without departing from the spirit and scope of the invention as defined in the claims. For instance, the valve components need not be circular, but may take on other shapes. The valve seat need not be slanted. The spring may be substituted by another biasing member. The scope of the invention should, therefore, be determined not with reference to the above description, but instead should be determined with reference to the appended claims along with their full scope of equivalents.

What is claimed is:

1. A valve comprising:
   a valve body including a valve cavity with an inlet and an outlet, the valve body having a valve seat in the valve cavity, the valve seat having a flow passage disposed between the inlet and the outlet; and
   a valve stem movable in the valve cavity between an open position and a closed position, the valve stem including a substantially rigid core and a resilient shell, the resilient shell being generally tubular and surrounding at least a portion of the rigid core, the resilient shell including a sealing surface which is spaced from the valve seat with the valve stem in the open position and which is pressed against the valve seat to block the flow passage between the inlet and the outlet with the valve stem in the closed position without a separate sealing member disposed between the valve stem and the valve seat.

2. The valve of claim 1 wherein the core of the valve stem comprises a longitudinal shaft.

3. The valve of claim 2 wherein the longitudinal shaft includes at least one spool, the resilient shell surrounding at least one spool of the longitudinal shaft.

4. The valve of claim 1 wherein the resilient shell comprises an elastomeric material.

5. The valve of claim 4 wherein the elastomeric material comprises Santoprene elastomer.

6. The valve of claim 1 wherein the resilient shell is molded onto the substantially rigid core.

7. The valve of claim 1 wherein the sealing surface of the resilient shell comprises an annular sealing surface.

8. The valve of claim 7 wherein the valve stem is movable generally along an axis, and wherein the annular sealing surface makes an angle with the axis of between about 15° and about 90°.

9. The valve of claim 8 wherein the annular sealing surface makes an angle with the axis of about 59°.

10. The valve of claim 1 further comprising a spring connected with the valve stem, the spring resiliently biasing the valve stem toward the closed position.

11. The valve of claim 10 wherein the resilient shell includes a spring cavity for receiving at least a portion of the spring therein.

12. The valve of claim 10 further comprising a resilient spring hat having a spring seat for receiving at least a portion of the spring therein, the resilient spring hat being disposed in the valve cavity by a press fit with an inner surface of the valve cavity.

13. The valve of claim 12 further comprising a support plate having an alignment cavity, wherein the resilient spring hat includes an external protrusion inserted into the alignment cavity of the support plate with a press fit.

14. The valve of claim 12 wherein the resilient spring hat comprises an elastomeric material.

15. A valve comprising:
   a valve body including a valve cavity with an inlet and an outlet, the valve body having a valve seat in the valve cavity, the valve seat having a flow passage disposed between the inlet and the outlet; and
   a valve stem movable in the valve cavity between an open position and a closed position, the valve stem including a core and a resilient shell, the resilient shell being generally tubular and molded onto the core, the resilient shell including a sealing surface which is spaced from the valve seat with the valve stem in the open position and which is pressed against the valve seat to block the flow passage between the inlet and the outlet with the valve stem in the closed position without a separate sealing member disposed between the valve stem and the valve seat.

16. The valve of claim 15 wherein the core comprises a substantially rigid shaft.

17. A valve comprising:
   a valve body including a valve cavity with an inlet and an outlet, the valve body having a valve seat in the valve cavity, the valve seat having a flow passage disposed between the inlet and the outlet;
   a valve stem movable in the valve cavity between an open position and a closed position, the valve stem including a core and a resilient shell, the resilient shell including a sealing surface which is spaced from the valve seat with the valve stem in the open position and which is pressed against the valve seat to block the flow passage between the inlet and the outlet with the valve stem in the closed position without a separate sealing member disposed between the valve stem and the valve seat, the resilient shell including a spring cavity;
   a resilient spring hat having a spring seat, the resilient spring hat being disposed in the valve cavity and making a sealing contact with an inner surface of the valve cavity; and
   a spring connected between the spring cavity of the resilient shell and the spring seat of the resilient spring hat.

18. The valve of claim 17 wherein the resilient shell comprises an elastomeric material.

19. The valve of claim 17 wherein the resilient shell is injection molded onto the core.

20. The valve of claim 17 wherein the resilient shell has a generally tubular member surrounding a portion of the core and forming the spring cavity.

* * * * *